United States Patent
Takahashi et al.

(10) Patent No.: US 9,631,628 B2
(45) Date of Patent: Apr. 25, 2017

(54) TURBOCHARGER

(71) Applicant: IHI Corporation, Koto-ku (JP)

(72) Inventors: Yukio Takahashi, Tokyo (JP); Shinichi Kaneda, Tokyo (JP)

(73) Assignee: IHI Corporation, Koto-ku (JP)

( * ) Notice: Subject to any disclaimer, the term of this patent is extended or adjusted under 35 U.S.C. 154(b) by 390 days.

(21) Appl. No.: 14/326,500

(22) Filed: Jul. 9, 2014

(65) Prior Publication Data

US 2014/0321986 A1  Oct. 30, 2014

Related U.S. Application Data

(63) Continuation of application No. PCT/JP2013/051957, filed on Jan. 30, 2013.

(30) Foreign Application Priority Data

Jan. 31, 2012  (JP) ................................. 2012-017901

(51) Int. Cl.
| | |
|---|---|
| *F01D 17/12* | (2006.01) |
| *F04D 27/00* | (2006.01) |
| *F01D 17/10* | (2006.01) |
| *F02B 37/18* | (2006.01) |

(52) U.S. Cl.
CPC ......... *F04D 27/009* (2013.01); *F01D 17/105* (2013.01); *F02B 37/183* (2013.01); *F02B 37/186* (2013.01); *F05D 2260/606* (2013.01); *Y02T 10/144* (2013.01)

(58) Field of Classification Search
CPC .... F02B 37/183; F02B 37/186; F04D 27/009; F05D 2260/606
See application file for complete search history.

(56) References Cited

U.S. PATENT DOCUMENTS

| | | | | |
|---|---|---|---|---|
| 4,655,043 A | * | 4/1987 | McInerney | ............. F01D 17/08 60/602 |
| 5,146,753 A | * | 9/1992 | Potter | .................. F02B 37/186 415/146 |
| 7,080,510 B2 | * | 7/2006 | Ishihara | ................ F02B 37/183 251/14 |

(Continued)

FOREIGN PATENT DOCUMENTS

| | | |
|---|---|---|
| CN | 1244626 A | 2/2000 |
| JP | 53-56931 | 5/1978 |
| JP | 60-178930 A | 9/1985 |

(Continued)

OTHER PUBLICATIONS

International Search Report issued on Apr. 16, 2013 for PCT/JP2013/051957 filed on Jan. 30, 2013 with English Translation.

(Continued)

*Primary Examiner* — Ninh H Nguyen
(74) *Attorney, Agent, or Firm* — Oblon, McClelland, Maier & Neustadt, L.L.P.

(57) ABSTRACT

A turbocharger includes: a turbine housing including a through-hole through which a turbine impeller is bypassed; and a wastegate valve configured to open and close the through-hole. A biasing portion biases the wastegate valve and a support plate in opposite directions, and restrains rotation of the wastegate valve relative to the support plate.

6 Claims, 3 Drawing Sheets

(56) References Cited

U.S. PATENT DOCUMENTS

2005/0241309 A1    11/2005   McEwen et al.
2012/0055154 A1     3/2012   Ebert

FOREIGN PATENT DOCUMENTS

| JP | 61-33923 U | 3/1986 |
|----|------------|--------|
| JP | 11-44219 A | 2/1999 |
| JP | 2012-67698 A | 4/2012 |
| WO | WO 2007/138325 A2 | 12/2007 |
| WO | 2010/135104 A2 | 11/2010 |

OTHER PUBLICATIONS

International Written Opinion mailed on Apr. 16, 2013 for PCT/JP2013/051957 filed on Jan. 30, 2013.
Office Action issued Dec. 15, 2015 in Chinese Patent Application No. 201380006564.X (with English language translation).

* cited by examiner

TURBOCHARGER

CROSS REFERENCE TO RELATED APPLICATIONS

This application is a continuation application of International Application No. PCT/JP2013/051957, filed on Jan. 30, 2013, which claims priority to Japanese Patent Application No. 2012-017901, filed on Jan. 31, 2012, the entire contents of which are incorporated by references herein.

BACKGROUND OF THE INVENTION

1. Field of the Invention

The present invention relates to a turbocharger.

2. Description of the Related Art

Turbochargers have been known as being used to increase output of engines by being connected to the engines and the like. As boost pressure of a turbocharger becomes higher, the subsequent flow rate and pressure of the exhaust gas become higher. As the torque of the turbocharger becomes higher, the boost pressure becomes much higher. As a result, the engine and the turbocharger become more likely to suffer damage. To avoid this, some turbochargers have a function of suppressing the pressure of the exhaust gas flowing into a turbine housing by making part of the exhaust gas flow from the engine to the downstream of the turbine while bypassing the turbine.

The turbine housing of the turbocharger having the foregoing function is provided with a through-hole making the upstream and downstream of a turbine impeller communicate with each other. In other words, the through-hole forms a bypass passage. Outside the turbine housing, a wastegate valve is placed to face the through-hole. The wastegate valve closes and opens the bypass passage by coming into contact with and getting away from the through-hole.

The wastegate valve is attached to a support plate which is moved by an actuator, and works together with the support plate. If, however, the wastegate valve and the support plate are completely fixed to each other, the wastegate valve cannot close the through-hole when force tilting the wastegate valve acts on the surface provided with the through-hole, and a gap occurs between the wastegate valve and the through-hole. To avoid this, a turbocharger disclosed in Japanese Patent Application Publication JP11-044219A (PTL 1) is provided with a clearance between the wastegate valve and the support plate. To put it specifically, the wastegate valve includes a valve body, and a projecting portion which projects from the valve body. On the other hand, the support plate is provided with an insertion hole. The projecting portion is inserted into the insertion hole, and a part of the projecting portion sticking out of the insertion hole is swaged with a washer or the like while retaining the clearance between the valve body and the support plate.

However, there is a backlash between the washer and the support plate, vibration of the engine makes the wastegate valve and the support plate repeatedly come into contact with and get away from each other, thereby causing noises (chattering). To avoid this, a turbocharger disclosed in WO2010/135104A2 (PTL 2) is provided with a belleville spring between the valve body and the support plate, and suppresses noises by keeping the valve body and the support plate in contact with the biasing force of the belleville spring.

SUMMARY OF THE INVENTION

The above-mentioned attachment structure, meanwhile, allows the wastegate valve to rotate relative to the support plate. This rotation causes frictional sounds between the support plate and the wastegate valve or the projecting portion. The frictional sounds are also a cause of noises. In the configuration disclosed in PTL 2, if the belleville spring can be welded to the wastegate valve or the support plate, the frictional sounds can be suppressed. However, a space enough for accomplishing a welding process is not present between the belleville spring and the wastegate valve or the support plate. For this reason, the configuration disclosed in PTL 2 needs to be additionally provided with a stopper configured to restrain the rotation of the wastegate valve.

An object of the present invention is to provide a turbocharger capable of achieving a noise suppressing effect by use of a simpler mechanism which restrains rotation of a wastegate valve while swingably supporting the wastegate valve.

An aspect of the present invention is a turbocharger includes: a bearing housing, one end side of which is fixed to a turbine housing and the other end side of which is fixed to a compressor housing; a turbine shaft, one end of which is provided with a turbine impeller housed in the turbine housing and the other end of which is provided with a compressor impeller housed in the compressor housing; a through-hole provided to the turbine housing and configured to make a fluid to be guided to the turbine impeller flow from an upstream to a downstream of the turbine impeller while bypassing the turbine impeller; a wastegate valve including a main body provided with a contact surface to open and close the through-hole, and a projecting portion provided on an opposite side of the main body from the contact surface; a support plate holding the projecting portion with the projection portion inserted in an insertion hole of the support plate, the support plate configured to cause the wastegate valve to open and close the through-hole along with movement of the support plate; and a biasing portion, one end of which is fixed to any one of the main body and the projecting portion and the other end of which is fixed to the support plate, and configured to restrain rotation of the wastegate valve and to bias the support plate and the any one of the main body and the projecting portion in opposite directions.

The one end of the biasing portion may be fixed to an opposite side of the projecting portion from the main body across the support plate, and the other end of the biasing portion may be fixed to any portion of the support plate other than its surface facing the main body.

The one end of the biasing portion may be fixed to the main body, and the other end of the biasing portion may be fixed to any portion of the support plate other than its surface facing the main body.

The biasing portion may be a leaf spring, and the other end of the biasing portion may be fixed to an outer surface of the support plate which is situated on an outer side in a radial direction of the insertion hole.

The biasing portion may be a coil spring.

The present invention makes it possible to achieve a noise suppressing effect by use of a simpler mechanism which restrains the rotation of the wastegate valve while swingably supporting the wastegate valve.

DESCRIPTION OF THE PREFERRED EMBODIMENTS

Referring to the accompanying drawings, detailed descriptions will be hereinbelow provided for a preferred embodiment of the present invention. Dimensions, materials, specific values and the like shown for the embodiment are mere examples for facilitating the understanding of the present invention, and are not intended to limit the present invention unless otherwise indicated. It should be noted that in the description and the drawings, the components having virtually the same functions and structures will be denoted with the same reference signs, and duplicated explanations will be omitted. Meanwhile, illustration of components not directly related to the present invention will be omitted.

Figure 1:
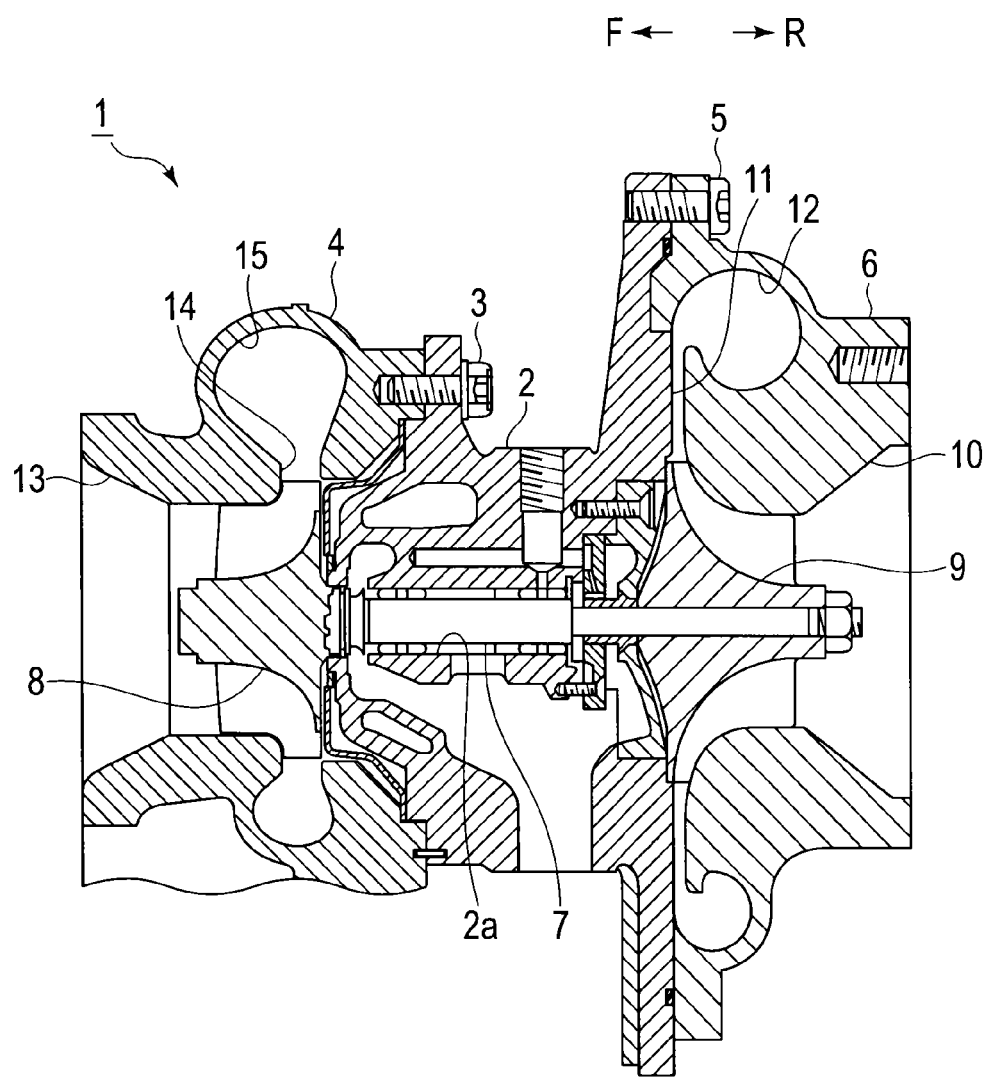
FIG. 1 is a schematic cross-sectional view of a turbocharger.
Figure 2:
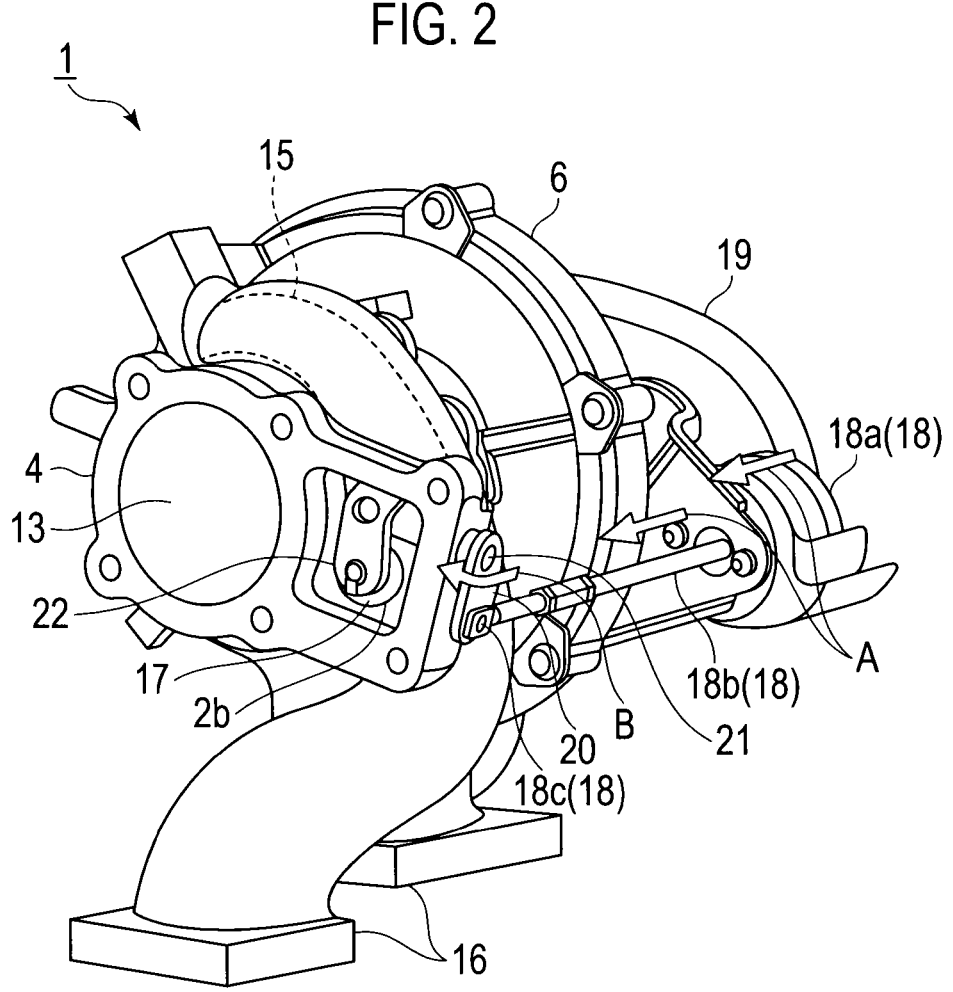
FIG. 2 is a perspective view of an external appearance of the turbocharger.

FIG. 1 is a schematic cross-sectional view of a turbocharger 1. FIG. 2 is a perspective view of an external appearance of the turbocharger 1. The following descriptions will be provided on the premise that a direction of an arrow F shown in FIG. 1 is a front side of the turbocharger 1, and a direction of an arrow R therein is a rear side of the turbocharger 1. As shown in FIG. 1, the turbocharger 1 includes a bearing housing 2, a turbine housing 4 and a compressor housing 6. The turbine housing 4 is connected to the front side of the bearing housing 2 with bolts 3. The compressor housing 6 is connected to the rear side of the bearing housing 2 with bolts 5.

A bearing hole 2a penetrating the bearing housing 2 in the front-rear direction of the turbocharger 1 is formed in the bearing housing 2. A turbine shaft 7 is rotatably supported by the bearing hole 2a by use of bearings. A turbine impeller 8 is integrally connected to a front end portion (one extremity) of the turbine shaft 7. The turbine impeller 8 is rotatably housed in the turbine housing 4. In addition, a compressor impeller 9 is integrally connected to a rear end portion (the other extremity) of the turbine shaft 7. The compressor impeller 9 is rotatably housed in the compressor housing 6.

An inlet port 10 is formed in the compressor housing 6. The inlet port 10 is opened toward the rear of the turbocharger 1, and is connected to an air cleaner, which is not illustrated. When the compressor housing 6 is connected to the bearing housing 2 with the bolts 5, the opposing surfaces of the two housings 2, 6 form a diffuser passage 11 configured to boost the pressure of the air by compressing the air. The diffuser passage 11 is formed into an annular shape from its inner to outer sides in radial directions of the turbine shaft 7 (the compressor impeller 9). The inner side of the diffuser passage 11 in the radial directions communicates with the inlet port 10 via the compressor impeller 9.

The compressor housing 6 includes an annular compressor scroll passage 12. The compressor scroll passage 12 is situated outward of the diffuser passage 11 in the radial directions of the turbine shaft 7 (the compressor impeller 9). The compressor scroll passage 12 communicates with an intake port of an engine, which is not illustrated, and communicates with the diffuser passage 11 as well. For this reason, once the compressor impeller 9 rotates, a fluid is taken into the compressor housing 6 from the inlet port 10. The pressure of the fluid taken in is boosted by the diffuser passage 11 and the compressor scroll passage 12, and the resultant fluid is guided to the intake port of the engine.

The turbine housing 4 includes a discharge port 13. The discharge port 13 is opened toward the front of the turbocharger 1, and is connected to an exhaust emission controller, which is not illustrated. The turbine housing 4 further includes a passage 14 and an annular turbine scroll passage 15. The turbine scroll passage 15 is situated outward of the passage 14 in the radial directions of the turbine shaft 7 (the turbine impeller 8). The turbine scroll passage 15 communicates with a gas inlet 16 (shown in FIG. 2) to which exhaust gas emitted from an exhaust port of the engine is guided. In addition, the turbine scroll passage 15 communicates with the passage 14. For these reason, the exhaust gas is guided from the gas inlet 16 to the turbine scroll passage 15, and is further guided to the discharge port 13 via the passage 14 and the turbine impeller 8. During its flowing process of the exhaust gas, the exhaust gas rotates the turbine impeller 8. The torque of the turbine impeller 8 is transmitted to the compressor impeller 9 via the turbine shaft 7, and thereby rotates the compressor impeller 9. As described above, the torque of the compressor impeller 9 boosts the pressure of the fluid taken in, and the resultant fluid is guided to the intake port of the engine.

As shown in FIG. 2, the turbine housing 4 includes a wall portion which forms a passage connecting the gas inlet 16 to the turbine scroll passage 15 (indicated with dotted lines in FIG. 2). The wall portion is provided with a through-hole 2b. The through-hole 2b is opened in the same direction as is the discharge port 13. Part of the fluid flowing in from the gas inlet 16 can flow (out) to the downstream of the turbine impeller 8 via the through-hole 2b while bypassing the turbine impeller 8.

A wastegate valve 17 is a valve configured to close the through-hole 2b by coming into contact with an edge portion of the through-hole 2b, and to open the through-hole 2b by becoming separated from the through-hole 2b. The wastegate valve 17 opens and closes in accordance with actions of the actuator 18.

The actuator 18 includes an actuation unit 18a. The pressure of the compressor scroll passage 12 is transmitted to the actuation unit 18a via a pipe 19. The actuation unit 18a is formed from: a cylindrical casing; and, among other things, a diaphragm and a spring which are placed inside the casing. Once the pressure from the pipe 19 exceeds the elastic force of the spring, the diaphragm acts to move the object (or the actuator 18) in a direction indicated with an arrow A in FIG. 2.

A rod 18b of the actuator 18 is connected to the actuation unit 18a (the diaphragm). Once the actuation unit 18a (the diaphragm) acts, the rod 18b moves in the direction of the arrow A in response to the action. In other words, the rod 18b makes a linear movement in response to the action of the actuation unit 18a. One end of the connection member 20 is connected to the extremity of the rod 18b. The one end of the connection member 20 is slidably supported by a shaft portion 18c of the rod 18b. The other end of the connection member 20 is fixed to one end of a shaft 21. The shaft 21 is rotatably held by the turbine housing 4. As shown in FIG. 2, the central axis of the rod 18b and the central axis of rotation of the shaft 21 three-dimensionally interest each other while being away from each other by a distance almost equal to the length of the connection member 20. For this reason, once the rod 18b moves, the connection member 20 rotates about the shaft 21 serving as the central axis of rotation. In response to the rotation of the connection member 20, the shaft 21 rotates in a direction indicated with an arrow B in FIG. 2. The wastegate valve 17 is held at the other end of the shaft 21 with the assistance of a support plate 22. For this reason, once the support plate 22 moves in response to the rotation of the shaft 21 in the direction of the arrow B, the wastegate valve 17 opens the through-hole 2b.

The valve lift of the wastegate valve 17 changes in accordance with the pressure of the fluid which is compressed by the compressor scroll passage 12. In accordance with the change in pressure, an amount of exhaust gas flowing to the downstream of the turbine impeller 8 while bypassing the turbine impeller 8 is adjusted.

As described above, the wastegate valve 17 adjusts the amount of the fluid (the exhaust gas) bypassing the turbine impeller 8 in response to the action of the actuation unit 18a. In other words, the wastegate valve 17 reduces the pressure of the exhaust gas flowing into the turbine scroll passage 15 from the gas inlet 16, and accordingly adjusts rotation output from the turbine impeller 8.

Figure 3:
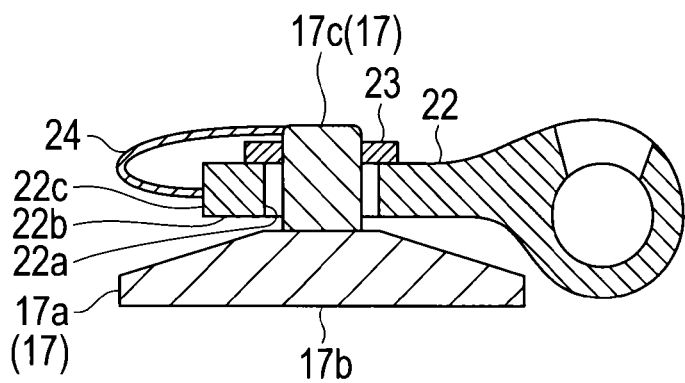
FIG. 3 is a schematic cross-sectional view for explaining a support structure for a wastegate valve.

FIG. 3 is a schematic cross-sectional view for explaining a support structure for the wastegate valve 17. As shown in FIG. 3, the wastegate valve 17 is attached to the support plate 22. To put it in detail, the wastegate valve 17 includes a main body 17a and a projecting portion 17c fixed to the main body 17a. The main body 17a includes a contact surface 17b which is in contact with the through-hole 2b of the turbine housing 4. The projecting portion 17c is fixed to an opposite surface of the main body 17a from the contact surface 17b. The projecting portion 17c projects in a direction opposite to the contact surface 17b. Here, the projecting portion 17c may be formed integrally with the main body 17a.

An insertion hole 22a is formed in the support plate 22. The insertion hole 22a penetrates the support plate 22 in such a direction that the support plate 22 faces the main body 17a of the wastegate valve 17. The projecting portion 17c of the wastegate valve 17 is inserted into and held by the insertion hole 22a. A fastener 23 is placed on a part of the projecting portion 17c which sticks out of the insertion hole 22a. The fastener 23 is fixed to the projecting portion 17c with a clearance left between the main body 17a and the support plate 22. The fastener 23 restricts the position (a tolerable range of movement) of the wastegate valve 17 relative to the support plate 22. Examples of the fastener 23 include a washer which is larger in outer diameter than the insertion hole 22a. The fastener 23 is fixed to the projecting portion 17c by swaging, welding or the like.

The turbocharger 1 includes a biasing portion 24. The biasing portion 24 is made from an elastic member such as a spring. The biasing member 24 of the embodiment is a leaf spring. One end of the biasing portion 24 is fixed to the projecting portion 17c, while the other end of the biasing portion 24 is fixed to the support plate 22. Examples of a method for this fixing include welding, swaging, and bolt-fastening. Other well-known methods are applicable.

The one end of the biasing portion 24 is fixed to an opposite side of the projecting portion 17c from the main body 17a with the support plate 22 interposed in between. The other end of the basing portion 24 is fixed to a position in the support plate 22 which is farther away from the main body 17a than is a surface 22b of the support plate 22 which faces the main body 17a. To put it in detail, the other end of the biasing portion 24 is fixed to an outer surface 22c of the support plate 22 which is situated on an outer side in a radial direction of the insertion hole 22a.

The above-described fixation by welding or the like restrains the rotation of the biasing portion 24 about the projecting portion 17c of the wastegate valve 17.

The biasing portion 24 biases the projecting portion 17c and the support plate 22 in their respective opposite directions. In other words, the biasing portion 24 biases the projecting portion 17c downward in FIG. 3, and the support plate 22 upward in FIG. 3.

In this respect, the biasing portion 24 is fixed in a state where the biasing portion 24 is opened wider than while no load is imposed on the biasing portion 24 (or in a state of application of force in a tensile direction). In other words, stress trying to close the biasing portion 24 always occurs inside the biasing portion 24. For this reason, the support plate 22 is pressed against the fastener 23 by the biasing force in the direction to close the biasing portion 24.

Here, the biasing portion 24 may be fixed in a state where the biasing portion 24 is less opened than while no load is imposed on the biasing portion 24 (or in a state of application of force in a compressive direction). In this case, the support plate 22 is pressed against the main body 17a by the biasing force in the direction to open the biasing portion 24. Furthermore, the fastener 23 may be omitted in this case.

As described above, in the turbocharger 1 of the embodiment, the biasing portion 24 biases the main body 17a and the support plate 22 in their respective opposite directions. The biasing portion 24 is fixed to the main body 17a and the support plate 22 by welding or the like. For this reason, the wastegate valve 17 is always restrained from its rotation. Moreover, when the contact surface 17b of the wastegate valve 17 comes in inclined contact with the surface provided with the through-hole 2b, the contact surface 17b is forced to become parallel with the surface provided with the through-hole 2b against the elastic force of the biasing portion 24.

Accordingly, the turbocharger 1 is capable of securely closing the through-hole 2b by use of the wastegate valve 17. In addition, while the through-hole 2b is opened, the elastic force of the biasing portion 24 keeps the support plate 22 and the fastener in close contact. This state of close contact inhibits intermittent contact and friction between the support plate 22 and the wastegate valve 17 which occur due to vibration of the engine and the like. Accordingly, noises attributed to the contact and friction are suppressed. This mechanism is achieved only with the simple configuration in which the biasing portion 24 is fixed to the projecting portion 17c and the support plate 22 by welding or the like, and its production cost is inexpensive. For this reason, the turbocharger 1 of the embodiment can be produced at low cost.

(First Modification)

Figure 4A:
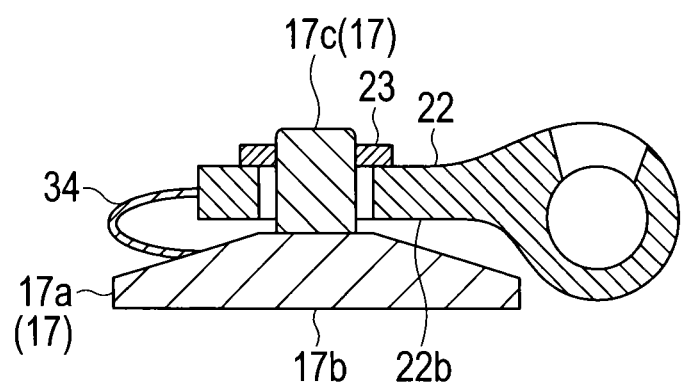
FIGS. 4A and 4B show explanatory diagrams for explaining modifications.
Figure 4B:
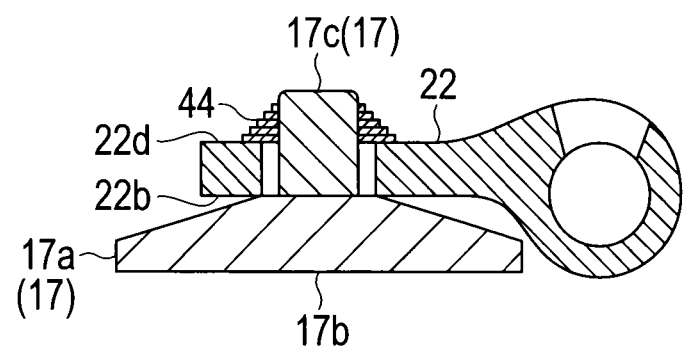

FIGS. 4A and 4B show explanatory diagrams for explaining modifications. Specifically, FIG. 4A is a cross-sectional view of a first modification, which corresponds to FIG. 3. FIG. 4B is a cross-sectional view of a second modification, which corresponds to FIG. 3.

In the foregoing embodiment, the one end of the biasing portion 24 is fixed to the projecting portion 17c, while the other end of the biasing portion 24 is fixed to the support plate 22 by welding or the like. On the other hand, in the first modification, as shown in FIG. 4A, one end of a biasing portion 34 is fixed to the main body 17a, and the other end of the biasing portion 34 is fixed to the support plate 22.

To put it in detail, the one end of the biasing portion 34 is fixed to the main body 17a, while the other end of the biasing portion 34 is fixed to a position in the support plate 22 which is farther away from the main body 17a than is the surface 22b of the support plate 22 which faces the main body 17a.

In this case, the biasing portion 34 is fixed in a state where the biasing portion 34 is less opened than while no load is imposed on the biasing portion 34. For this reason, the support plate 22 is pressed against the fastener 23 by the biasing force in direction to open the biasing portion 34.

Here, that the biasing portion 34 may be fixed in a state where the biasing portion 24 is opened wider than while no load is imposed on the biasing portion 34. In this case, the support plate 22 is pressed against the main body 17a by biasing force in the direction to close the biasing portion 34. Furthermore, the fastener 23 may be omitted in this case.
(Second Modification)

In the second modification, as shown in FIG. 4B, a biasing portion 44 is made from a coil spring. More specifically, the coil spring is a conical spring.

In the second modification, one end of the biasing portion 44 is fixed to an opposite side of the projecting portion 17c from the main body 17a with the support plate 22 interposed in between. The other end of the biasing portion 44 is fixed to a position in the support plate 22 which is farther away from the main body 17a than is the surface 22b of the support plate 22 which faces the main body 17a. To put it specifically, the position is located on a surface 22d which is opposite to the surface 22b.

In FIG. 4B, the biasing portion 44 is fixed while being compressed in a vertical direction from the state under no load. For this reason, the support plate 22 is pressed against the main body 17a by the biasing force in a direction to expand the biasing portion 44.

Like the foregoing embodiment, each of the first and second modifications can achieve by its simple configuration the mechanism which enables the turbocharger 1 to securely close the through-hole 2b by use of the wastegate valve 17, and to suppress noises caused by the contact and friction between the support plate 22 and the wastegate valve 17. Furthermore, the turbocharger 1 of each modification can be produced at low cost.

Although the preferred embodiment of the present invention has been described above with reference to the accompanying drawings, it goes without saying that the present invention is not limited to the embodiment. It is clear that those skilled in the art could arrive at various modifications or corrected examples within the scope defined in the appended claims. It shall be understood that those modifications and corrected examples are naturally encompassed by the technical scope of the present invention.

The foregoing descriptions have been provided for the embodiment and the modifications in which the other end of the biasing portion is fixed to the outer surface 22c or the surface 22d of the support plate 22. However, the place to which the biasing portion is fixed may be any area other than the surface 22b facing the main body 17a. Such a configuration makes it easier for the fixing process, such as welding, to be carried out as compared to a configuration in which the other end of the biasing portion is fixed to the surface 22b facing the main body 17a.

It should be noted that the present invention is not limited to the foregoing embodiment. The present invention is applicable to a turbocharger like a so-called twin scroll turbocharger, for example, which includes multiple turbine scroll passages. In this case, bypass passages are provided individually for the respective turbine scroll passages in order to distribute the gas flow among the turbine scroll passages. The valve mechanisms of the present invention are provided to the respective bypass passages and configured to adjust a ratio of inflow of the exhaust gas among the turbine scroll passages.

Moreover, the present invention is applicable to a turbocharger system including multiple turbochargers. In this case, the multiple turbochargers are connected together in series in a direction of a flow of exhaust gas. For example, if the turbocharger system includes a turbocharger situated upstream in the direction of the flow of the exhaust gas and a turbocharger situated downstream in the direction of the flow of the exhaust gas, a discharge port of the upstream turbocharger is connected to a gas inlet of the downstream turbocharger by use of an exhaust passage. The valve mechanisms of the present invention are provided to the respective turbochargers and configured to adjust a ratio of inflow of the exhaust gas among the turbine scroll passages of the turbochargers.

What is claimed is:

1. A turbocharger comprising:
    a bearing housing, one end side of which is fixed to a turbine housing and the other end side of which is fixed to a compressor housing;
    a turbine shaft, one end of which is provided with a turbine impeller housed in the turbine housing and the other end of which is provided with a compressor impeller housed in the compressor housing;
    a through-hole provided to the turbine housing and configured to make a fluid to be guided to the turbine impeller flow from an upstream to a downstream of the turbine impeller while bypassing the turbine impeller;
    a wastegate valve including a main body provided with a contact surface to open and close the through-hole, and a projecting portion provided on an opposite side of the main body from the contact surface;
    a support plate holding the projecting portion with the projection portion inserted in an insertion hole of the support plate, the support plate configured to cause the wastegate valve to open and close the through-hole along with movement of the support plate; and
    a biasing portion, one end of which is fixed to any one of the main body and the projecting portion and the other end of which is fixed to the support plate, and configured to restrain rotation of the wastegate valve and to bias the support plate and the any one of the main body and the projecting portion in opposite directions,
    wherein a clearance is left between the main body of the wastegate valve and the support plate.

2. The turbocharger according to claim 1, wherein
    the one end of the biasing portion is fixed to an opposite side of the projecting portion from the main body across the support plate, and
    the other end of the biasing portion is fixed to any portion of the support plate other than its surface facing the main body.

3. The turbocharger according to claim 2, wherein
    the biasing portion is a leaf spring, and
    the other end of the biasing portion is fixed to an outer surface of the support plate which is situated on an outer side in a radial direction of the insertion hole.

4. The turbocharger according to claim 2, wherein the biasing portion is a coil spring.

5. The turbocharger according to claim 1, wherein
    the one end of the biasing portion is fixed to the main body, and
    the other end of the biasing portion is fixed to any portion of the support plate other than its surface facing the main body.

6. The turbocharger according to claim 5, wherein
    the biasing portion is a leaf spring, and
    the other end of the biasing portion is fixed to an outer surface of the support plate which is situated on an outer side in a radial direction of the insertion hole.

* * * * *